(12) United States Patent
Alberto et al.

(10) Patent No.: US 12,546,678 B2
(45) Date of Patent: Feb. 10, 2026

(54) METHOD FOR DETERMINING A GAS QUANTITY IN AN INSULATED SWITCHGEAR

(71) Applicant: Schneider Electric Industries SAS, Rueil Malmaison (FR)

(72) Inventors: Diego Alberto, Corenc (FR); Philippe Brun, Bernin (FR); Raimund Summer, Regensburg (DE)

(73) Assignee: Schneider Electric Industries SAS, Rueil Malmaison (FR)

( * ) Notice: Subject to any disclaimer, the term of this patent is extended or adjusted under 35 U.S.C. 154(b) by 235 days.

(21) Appl. No.: 18/135,776

(22) Filed: Apr. 18, 2023

(65) Prior Publication Data

US 2023/0349787 A1   Nov. 2, 2023

(30) Foreign Application Priority Data

Apr. 28, 2022   (EP) .................................... 22305632

(51) Int. Cl.
    *G01M 3/32*   (2006.01)
(52) U.S. Cl.
    CPC .................................... *G01M 3/32* (2013.01)
(58) Field of Classification Search
    None
    See application file for complete search history.

(56) References Cited

U.S. PATENT DOCUMENTS

| | | | | |
|---|---|---|---|---|
| 9,885,646 B2 * | 2/2018 | Scheucher | ............. | G01N 9/266 |
| 11,927,618 B2 * | 3/2024 | Morskieft | ............. | G01L 9/0072 |
| 11,971,442 B2 * | 4/2024 | Coapes | ............. | H01H 11/0062 |
| 2011/0153232 A1 | 6/2011 | Ito | | |
| 2014/0321031 A1 * | 10/2014 | Kramer | ............. | G01N 33/0032 |
| | | | | 361/618 |

(Continued)

FOREIGN PATENT DOCUMENTS

EP   3671997 A1   6/2020

OTHER PUBLICATIONS

Graber, Lukas, "Improving the Accuracy of SF6 Leakage Detection for High Voltage Switchgear", IEEE Transactions on Dielectrics and Electrical Insulation, vol. 18, No. 6, Dec. 2011, pp. 1835-1846.

(Continued)

*Primary Examiner* — Mark A Shabman
(74) *Attorney, Agent, or Firm* — Patterson + Sheridan, LLP

(57) ABSTRACT

A method for determining a quantity of a gas contained in a tank of an insulated switchgear. The method includes: (i) acquiring a first temperature and a second temperature measured by a gas temperature sensor respectively at a first instant and at a second instant during a calibration phase; (ii) acquiring a first pressure and a second pressure measured by a gas pressure sensor at the first instant and at the second instant; (iii) determining a steady-state model of the tank thermal exchanges from the first and second acquired temperature and from the first and second acquired pressure; (iv) acquiring a gas temperature, a gas pressure and an ambient temperature during a measurement phase and (v) calculating the quantity of the gas contained in the tank from the acquired gas temperature, the acquired gas pressure, the acquired ambient temperature and from the determined steady state model.

16 Claims, 7 Drawing Sheets

(56) References Cited

U.S. PATENT DOCUMENTS

2015/0308938 A1  10/2015  Scheucher
2015/0355049 A1* 12/2015  Ait Abdelmalek ... G01M 3/002
                                                  702/45
2019/0170804 A1*  6/2019  Thomas .............. G01R 31/69

OTHER PUBLICATIONS

European Search Report and Search Opinion dated Oct. 12, 2022 for corresponding European Patent Application No. EP22305632.6, 6 pages.

* cited by examiner

METHOD FOR DETERMINING A GAS QUANTITY IN AN INSULATED SWITCHGEAR

TECHNICAL FIELD

This disclosure relates to medium voltage electrical distribution systems, and more particularly to a method for determining the quantity of the gas contained in the tank of a gas insulated switchgear. In addition, this method of quantity determination can be a basis used by a leak detection method.

BACKGROUND ART

Gas insulated switchgears include a connection/disconnection element for one or several phases of a medium voltage electrical network. This connection/disconnection element is installed in a tank filled with gas. The dielectric properties of the gas help to assist the arc switching or to provide electrical insulation between the different phases. The tank and all its interfaces are sealed, so that the tank doesn't need to be replenished throughout the useful life of the equipment. The gas may for example be an inert gas like SF6. In other applications, the gas can also be pressurized air.

It is known to monitor the quantity of the gas contained in the tank via temperature and pressure measurements. For this, a sensor with a pressure sensing probe and a temperature sensing probe are fixed in an interface plug fixed to a tank panel. The sensing elements are thus in contact with the gas inside the tank. The quantity of the gas can therefore be calculated and monitored during the operation of the switchgear from the pressure and temperature measurements. The correct operation of the electrical equipment can be checked from this quantity monitoring. For example, a drop in gas quantity may indicate a premature leak of the tank, that may require maintenance.

Detecting a small leak can be difficult. A small leak causes by nature a slow decrease in gas quantity. For example, a pressure drop from 1.2 bar to 1.1 bar can take several weeks or months and still should be detected. In addition, the pressure inside the tank is influenced by the temperature of the gas, which is itself influenced, on top of the ambient temperature, by the intensity of the current in the electrical conductors, and is therefore influenced by the way the electrical equipment is operated. As the gas pressure and temperature sensors are located on the walls of the tank, the measured temperature may not be representative of the gas average temperature. In addition, because the thermal sensor is located on the wall of the tank and is not perfectly adiabatic, a thermal exchange between the inner gas in the sensor and the external environment exists and reduces the accuracy of the temperature measurement itself. Therefore, the accuracy of the quantity calculation required to detect a low level of leakage may be difficult to achieve.

The present disclosure proposes a method for estimating gas quantity in a gas-filled tank with an increased accuracy. A leakage detection method using the method for estimating gas quantity is also proposed.

SUMMARY

To this end, it is proposed a method for determining a quantity of a gas contained in a tank of a gas insulated switchgear, the tank comprising a gas temperature sensor and a gas pressure sensor, the method comprising the following steps during a calibration phase:
(i) acquiring a first temperature and a second temperature measured by the gas temperature sensor respectively at a first instant and at a second instant,
(ii) acquiring a first pressure and a second pressure measured by the gas pressure sensor at the first instant and at the second instant,
(iii) determining a steady-state model of the tank thermal exchanges from the first and second acquired temperature and from the first and second acquired pressure,
the method further comprising the following steps during a measurement phase:
(iv) acquiring a gas temperature measured by the gas temperature sensor,
(v) acquiring a gas pressure measured by the pressure sensor,
(vi) acquiring an ambient temperature measured by an ambient temperature sensor outside the tank during the measurement phase,
(vii) determining the quantity from the acquired gas temperature, the acquired gas pressure, the acquired ambient temperature and the determined steady state model.

The steady-state model comprises a first thermal resistance between the gas contained in the tank and the gas temperature sensor, and comprising a second thermal resistance between the gas temperature sensor and an ambient air outside the tank.

The temperature measurement provided by the sensor may be significantly different from the actual temperature of the gas contained in the tank, because the sensor is not inside the tank and is not perfectly thermally isolated. Furthermore, the actual position of the temperature sensor relatively to the tank influences the heat transfer and in turn the measurements of the sensor. In order to better estimate the quantity of the gas contained inside the tank, the proposed method integrates a model of the heat transfer towards the measurement sensor, in order to estimate the actual gas temperature with a better accuracy. The proposed thermal exchanges model uses only data obtained at two different instants without fitting any additional sensor inside the tank. Therefore, the model can be individually calibrated on each individual equipment without any deviation from the configuration that will be used throughout the equipment life. The calibration is thus easy and with no risk for the equipment reliability.

The following features can optionally be implemented, separately or in combination one with the others:

According to an aspect of the disclosure, the gas temperature sensor comprises a temperature sensing element configured to be in contact with the gas inside the tank and a sensor body configured to be in contact with the ambient air outside the tank.

In an embodiment, the gas temperature sensor is fixed to a panel of the tank.

The interface plug defines an opening in a panel of the tank. This opening is obtured by the body of the gas temperature sensor when the gas temperature sensor is fitted.

The body of the gas temperature sensor protrudes from an external side of a panel of the tank.

The implementation of the sensor is easy since it is disposed outside the tank.

The gas pressure sensor comprises a pressure sensing element configured to be in contact with the gas contained in the tank.

In an embodiment, the pressure sensing element and the temperature sensing element are housed in the same sensor body.

A single interface plug is needed to obtain the two measurements.

In an embodiment of the method, the steady-state model comprises the ratio of:
- the first thermal resistance between the gas contained in the tank and the gas temperature sensor, and
- the second thermal resistance between the gas temperature sensor and the ambient air outside the tank.

This model is simple and robust, as it also implicitly takes into account the thermal exchanges between the tank and the ambient air around the tank.

According to an embodiment of the method, the gas quantity is determined from the ratio of the acquired gas pressure and a corrected gas temperature, the corrected gas temperature being calculated from the equation:

$$Tcor = Tsens + \frac{R1}{R2} * (Tsens - Tamb) \quad \text{(equation 1)}$$

wherein

Tcor is the corrected temperature of the gas inside the tank,

Tsens is the gas temperature measured by the gas temperature sensor,

R1 is the first thermal resistance between the gas contained in the tank and the gas temperature sensor, R2 is the second thermal resistance between the gas temperature sensor and the ambient air outside the tank, Tamb is the ambient temperature measured outside the tank.

This equation increases the accuracy of the temperature measurement while being simple to implement.

The gas quantity n can be determined from the equation:

$$Tcor = Tsens + \frac{R1}{R2} * (Tsens - Tamb) \quad \text{(equation 1)}$$

wherein K is a constant and Psens is the acquired gas pressure measured by the gas pressure sensor. Based on ideal gas model, K is for example be obtained by the ratio:

$$K = \frac{V}{R}$$

wherein R is the ideal gas constant and V is the internal volume of the tank.

By "gas quantity" according to the present disclosure, it is also meant any measurement or calculation that allows to derive the gas quantity contained in the tank. Also, the term "gas quantity" encompasses related physical parameters that may be gas number of moles, gas mass, gas density, etc. since the internal volume of the tank is kept constant.

Also, according to another embodiment, the gas quantity can be derived from a gas pressure P0 determined from the equation:

$$P0 = T0 * \frac{Psens}{Tcor} \quad \text{(equation 3)}$$

wherein T0 is a reference temperature and P0 is the equivalent gas pressure if the gas is at a temperature T0. T0 is for example 293K.

According to another embodiment, the gas quantity can be derived from a density D determined from the equation:

$$D = K' * \frac{Psens}{Tcor} \quad \text{(equation 4)}$$

wherein K' is a constant. K' can be obtained by the ratio:

$$K' = \frac{Tref}{Pref}$$

wherein Tref is a reference temperature and Pref is a reference pressure. Tref is for example 293K. Pref is for example 101325 Pa. Reference temperature and reference pressure can be arbitrarily chosen, as long as the constant coefficient K' is updated with the chosen values of Tref and Pref.

More generally from the other embodiments given above, it is to be understood that the gas quantity according to the present disclosure can correspond to any parameter that is proportional to a fraction between the acquired gas pressure measured by the gas pressure sensor and the corrected temperature, and that can give a true reflection of the quantity of gas contained in the tank.

In an embodiment of the method, the step (iii) of determining a steady-state model of the tank thermal exchanges comprises the sub-steps:

(iii1) acquiring a first ambient temperature and a second ambient temperature, respectively at the first instant and at the second instant during the calibration phase, (iii2) calculating an updated value of the ratio of the first thermal resistance between the gas contained in the tank and the gas temperature sensor and of the second thermal resistance between the gas temperature sensor and the ambient air outside the tank, from the equation:

$$\frac{R1}{R2} = \frac{P2*T1 - P1*T2}{P1*(T2 - Tamb2) - P2*(T1 - Tamb1)} \quad \text{(equation 5)}$$

wherein

R1 is the first thermal resistance between the gas contained in the tank and the gas temperature sensor, R2 is the second thermal resistance between the gas temperature sensor and the ambient air outside the tank, P1 is the pressure measured by the gas pressure sensor at the first instant, P2 is the pressure measured by the gas pressure sensor at the second instant, T1 is the first temperature measured by the gas temperature sensor at the first instant, T2 is the second temperature measured by the gas temperature sensor at the second instant, Tamb1 is the ambient temperature at the first instant, Tamb2 is the ambient temperature at the second instant.

This model with two different thermal resistance provides a good accuracy and requires only reasonable effort for its calibration. Furthermore, this model is robust and can be used for various equipment configurations.

In an embodiment of the method, the step (iii) of determining a steady-state model of the tank thermal exchanges comprises the sub-step:

(iii3) after the acquisition of the first temperature and before the acquisition of the second temperature measurement, modifying an electrical current intensity in the switchgear so that the temperature of the gas contained in the tank is modified.

According to an aspect of the method, the first instant and the second instant are selected such that: the difference between the second instant and the first instant is higher than a first predetermined threshold.

The first predetermined threshold is for example 3 hours.

The duration between the first instant and the second instant is selected to be long enough so that a new thermal equilibrium is obtained when the second temperature measurement and the second pressure measurement are performed.

According to another aspect of the method, the first instant and the second instant are selected such that:

the difference between the second acquired temperature and the first acquired temperature is higher than a second predetermined threshold.

The second predetermined threshold is for example 5° C.

This temperature difference indicates that the transition between the first state and the second state has enough amplitude to be differentiated from the background noise of a steady state operation.

According to another aspect of the method, the first instant and the second instant are selected such that:

the difference between the second acquired temperature and the second ambient temperature is higher than a third predetermined threshold.

The third predetermined threshold is for instance 5° C.

As before, this temperature difference indicates that the transition between the first state and the second state has enough amplitude for allowing a accurate identification of the model parameters.

In an embodiment of the method, the sub-steps (iii1), (iii2) and (iii3) are iterated for determining the steady-state model of the tank thermal exchanges.

The consistency of the identification of the model parameters can thus be checked.

The ratio R1/R2 is initialized for instance to 1.25.

The present disclosure relates also to a method for detecting a gas leakage in a tank of a gas insulated switchgear, comprising the steps:

determining the quantity of the gas contained in the tank by the method described earlier, detecting a gas leakage based on the evolution of the gas quantity in function of time.

Tank leakage detection methods are generally based on a monitoring of the pressure inside the tank. As this pressure is influenced by the temperature of the gas, a drop in pressure is not necessarily caused by a leakage but can also be caused by a temperature drop. On the other hand, the effect of a real leakage may remain undetected if the gas temperature increases simultaneously. A detection method based on monitoring of gas quantity in order to directly compensate the effect of temperature evolutions is more accurate. The detection of a leakage may be quicker, as the safety margin to avoid false detection can be reduced.

The sampling frequency of the gas pressure measurement is comprised between 0.01 Hz and 1 Hz.

In an embodiment, the method comprises the steps:

determining a filtered value of the gas quantity in function of time, detecting a gas leakage based on the evolution of the filtered value of the gas quantity in function of time.

Using a filtered value allows putting into evidence the long term evolution of the quantity of the gas contained inside the tank, independently from the short-term evolutions due to the changes in operating conditions, like current intensity.

According to an embodiment, the method comprises the steps:

calculating an average slope of the filtered value of the gas quantity, if the average slope is higher than a predetermined threshold, detecting that a leakage is present, if the average slope is lower than or equal to the predetermined threshold, detecting that the tank is sealed.

According to an implementation of the method, the filtered value of the gas quantity is a sliding average of the gas quantity over a predetermined duration.

The predetermined duration is comprised between 10 days and 20 days.

In a variant of the method, the filtered value of the gas quantity is obtained by a first order filter applied to the gas quantity.

The time constant of the first order filter is for example comprised between 1 hour and 6 hours.

The disclosure also refers to an electrical equipment comprising a switchgear, a tank configured for accommodating the switchgear, and an electronic control unit configured for implementing a gas temperature correction method as described above or for implementing a gas leakage detection method as described before.

The electrical equipment comprises a gas temperature sensor. The electrical equipment comprises a gas pressure sensor. The electrical equipment comprises an ambient temperature sensor.

BRIEF DESCRIPTION OF DRAWINGS

Other features, details and advantages will be shown in the following detailed description and on the figures, on which.

DESCRIPTION OF EMBODIMENTS

In order to make the figures easier to read, the various elements are not necessarily represented to scale. In these figures, identical elements receive the same reference number. Certain elements or parameters can be indexed, that is to say designated for example by 'first element' or second element, or first parameter and second parameter, etc. The purpose of this indexing is to differentiate elements or parameters that are similar, but not identical. This indexing does not imply a priority of one element, or one parameter over another, and their names can be interchanged. When it is mentioned that a subsystem comprises a given element, the presence of other elements in this subsystem is not excluded.

Figure 1:
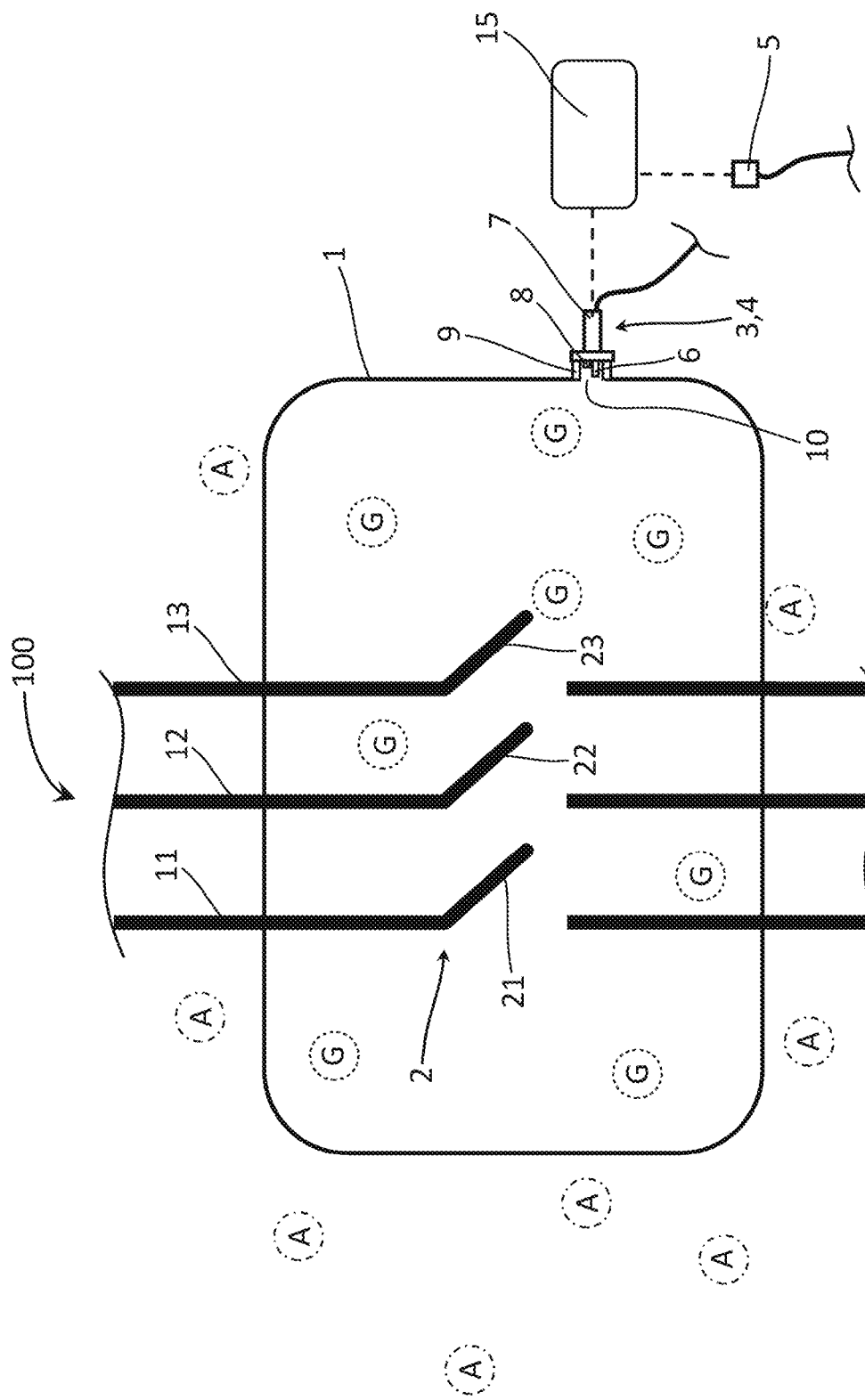
FIG. 1 is a schematic view of an electrical equipment comprising a gas insulated switchgear contained in a tank.

FIG. 1 illustrates schematically an electrical equipment 100 comprising a switchgear 2, a tank 1 configured for accommodating the switchgear 2, and an electronic control unit 15.

The electronic control unit 15 is configured for implementing a gas temperature correction method that will be described below. The electronic control unit 15 is also configured for implementing a gas leakage detection method that will be later described.

The tank 1 defines an enclosure configured to accommodate the switchgear 2. This inside volume of the tank 1 is filled with a gas G when the tank 1 is in normal operating conditions. The pressurized gas avoids the creation of an electric arc when the switchgear 2 is operated to interrupt the electrical current in the circuit. The outside of the tank 1 is exposed to the ambient temperature and ambient pressure of the ambient air A of the room in which the tank 1 is installed. The pressure of the gas is higher than the ambient pressure outside of the tank 1, which is the local atmospheric pressure. The tank 1 comprises several panels assembled to form a sealed enclosure defining a sealed volume. For example, the panels of the tank 1 are welded together. The panels may be fixed on a subframe that ensures a stiffness sufficient to resist to the pressure differential between the inside and the outside of the tank 1. The tank 1 comprises sealed interfaces allowing the entry and exit of the electrical conductors 11, 12, 13 connected to the switchgear 2. Each of the electrical conductor correspond here to a different phase of an electrical network. The tank 1 may be filled with inert gas like sulfur hexafluoride ($SF_6$). The tank 1 may also be filled by air. Each phase of the electrical circuit can be interrupted by an interrupter 21, 22, 23. FIG. 1 represents the switchgear 2 in an opened position of the interrupters 21, 22, 23.

Although the tank is built to be fluid tight, small leakages may occur during the lifetime of the electrical equipment 100 and the quantity of gas contained within the tank 1 may be slowly deplenished. The dielectric properties thus slowly deteriorate and the risks of creation of an electric arc increase. For this reason, the quantity of the gas contained in the tank 1 is monitored so that the users of the electrical equipment can receive an alert signal if the gas quantity becomes insufficient. In order to monitor gas quantity, gas temperature and gas pressure are measured.

The electrical equipment 100 thus comprises a gas temperature sensor 3. The electrical equipment 100 also comprises a gas pressure sensor 4. The electrical equipment 100 additionally comprises an ambient temperature sensor 5.

As schematically represented on FIG. 1, the gas temperature sensor 3 comprises a temperature sensing element 6 configured to be in contact with the gas G inside the tank 1 and a sensor body 7 configured to be in contact with the ambient air A outside the tank 1.

The gas temperature sensor 3 is here fixed to a panel of the tank 1. The panel of the tank 1 comprises an interface plug 9 on which the gas temperature sensor 3 is fixed. The interface plug 9 may comprise an internal thread in which the sensor body 7 is fixed like a screw.

The interface plug 9 defines an opening 10 in a panel of the tank 1. This opening 10 is obtured by the body 7 of the gas temperature sensor 3 when the gas temperature sensor 3 is fitted. A seal may be disposed between the interface plug 9 and the body 7 of the temperature sensor to ensure fluid tightness of the tank 1.

The body 7 of the gas temperature sensor 3 protrudes from an external side of a panel of the tank 1. The implementation of the sensor is easy, since it is disposed outside the tank 1, and the wires of the gas temperature sensor 3 are kept outside the internal volume of the tank. The body 7 of the gas temperature sensor 3 is exposed to the atmospheric pressure of the room.

The gas pressure sensor 4 comprises a pressure sensing element 8 configured to be in contact with the gas contained in the tank 1. In the represented example, the pressure sensing element 8 and the temperature sensing element 6 are housed in the same sensor body 7. A single interface plug 9 is required to install two different sensors and obtain gas temperature measurement and gas pressure measurement. The sensor is here a multi-function sensor combining pressure measurement and temperature measurement.

According to a non-represented design variant, the gas pressure sensor 4 may be a dedicated sensor, separated and independent from the gas temperature sensor 3. In this case, the pressure sensor 4 is fixed to a specific interface plug defining another opening hole in a panel of the tank 1.

The temperature sensing element 6 of the gas temperature sensor 3 may comprise a thermistor, for instance a negative coefficient thermistor. The temperature sensing element 6 may also comprise a thermocouple. Similarly, the ambient temperature sensor 5 may comprise a thermistor, like a negative coefficient thermistor, or may comprise a thermocouple.

The ambient temperature sensor 5 is for example installed on a control panel of the switchgear 2. The ambient temperature sensor 5 and the external surface of the tank 1 can be spaced apart from each other. The distance between the ambient temperature sensor 5 and the external surface of the tank 1 is preferably larger than 30 centimeters. The ambient temperature measurement is thus not affected by the heat dissipated by the tank 1. The measurement of the ambient temperature sensor 5 is considered to be fully representative of the ambient temperature of the room in which the tank 1 is installed. The ambient temperature sensor 5 comprises a temperature sensing element in contact with the ambient air A. The ambient temperature sensor 5 may comprise a thermistor, like for example a negative coefficient thermistor. The ambient temperature sensor 5 may comprise a thermocouple.

The proposed method is for determining a quantity n of a gas G contained in a tank 1 of a gas insulated switchgear 2, the tank 1 comprising a gas temperature sensor 3 and a gas pressure sensor 4.

The method comprises the following steps during a calibration phase:
(i) acquiring a first temperature T1 and a second temperature T2 measured by the gas temperature sensor 3 respectively at a first instant $t_1$ and at a second instant $t_2$,
(ii) acquiring a first pressure P1 and a second pressure P2 measured by the gas pressure sensor 4 at the first instant $t_1$ and at the second instant $t_2$,
(iii) determining a steady-state model M of the tank thermal exchanges from the first and second acquired temperature T1, T2 and from the first and second acquired pressure P1, P2. The steady-state model M comprises a first thermal resistance R1 between the gas G contained in the tank 1 and the gas temperature sensor 3. The steady-state model comprises a second thermal resistance R2 between the gas temperature sensor 3 and an ambient air A outside the tank 1.

The method further comprises the following steps during a measurement phase:

(iv) acquiring a gas temperature Tsens measured by the gas temperature sensor 3,
(v) acquiring a gas pressure Psens measured by the pressure sensor 4,
(vi) acquiring an ambient temperature Tamb measured by an ambient temperature sensor 5 outside the tank 1 during the measurement phase,
(vii) determining the quantity n from the acquired gas temperature Tsens, the acquired gas pressure Psens, the acquired ambient temperature Tamb and the determined steady state model M.

Gas temperature directly affects its quantity. The temperature measurement provided by the gas temperature sensor 3 may be significantly different from the actual temperature of the gas in close proximity to the switchgear 2, because the gas temperature sensor 3 is not located inside the tank and is not perfectly thermally isolated. Furthermore, the actual position of the gas temperature sensor 3 relatively to the tank 1 influences the thermal transfer and in turn the measurements of the gas temperature sensor 3. For example, the measurement may be different whether the sensor is fitted at the top of the tank 1 or at the bottom. In order to better estimate the quantity of the gas contained inside the tank 1, the proposed method integrates a model of the heat transfer towards the measurement sensor, in order to estimate the actual gas temperature with a better accuracy. The proposed thermal exchanges model uses only data obtained at two different instants without fitting any additional sensor inside the tank. Therefore, the model can be individually calibrated on each individual equipment without any deviation from the configuration that will be used throughout the equipment life. The calibration is thus easy and with no risk for the equipment reliability. The method involves an initial calibration phase to identify the model parameters. Once the model parameters are identified they can be used for the measurement phase.

The first pressure measurement P1 can be an average value of several consecutive samples. Similarly, the second pressure measurement P2 can be an average value of several consecutive samples. Measurement noise is thus reduced.

In an embodiment of the method, the steady-state model M comprises the ratio of:

the first thermal resistance R1 between the gas G contained in the tank 1 and the gas temperature sensor 3, and
the second thermal resistance R2 between the gas temperature sensor 3 and the ambient air A outside the tank 1.

This model is simple and robust, as it also implicitly takes into account the thermal exchanges between the tank 1 and the ambient air around the tank 1.

The temperature sensing element 6 of the gas temperature sensor 3 measures the temperature of the gas surrounding the sensing element 6. The first thermal resistance R1 is the thermal resistance between the gas G contained in the tank 1 and the gas in the temperature sensor 3.

Figure 2:
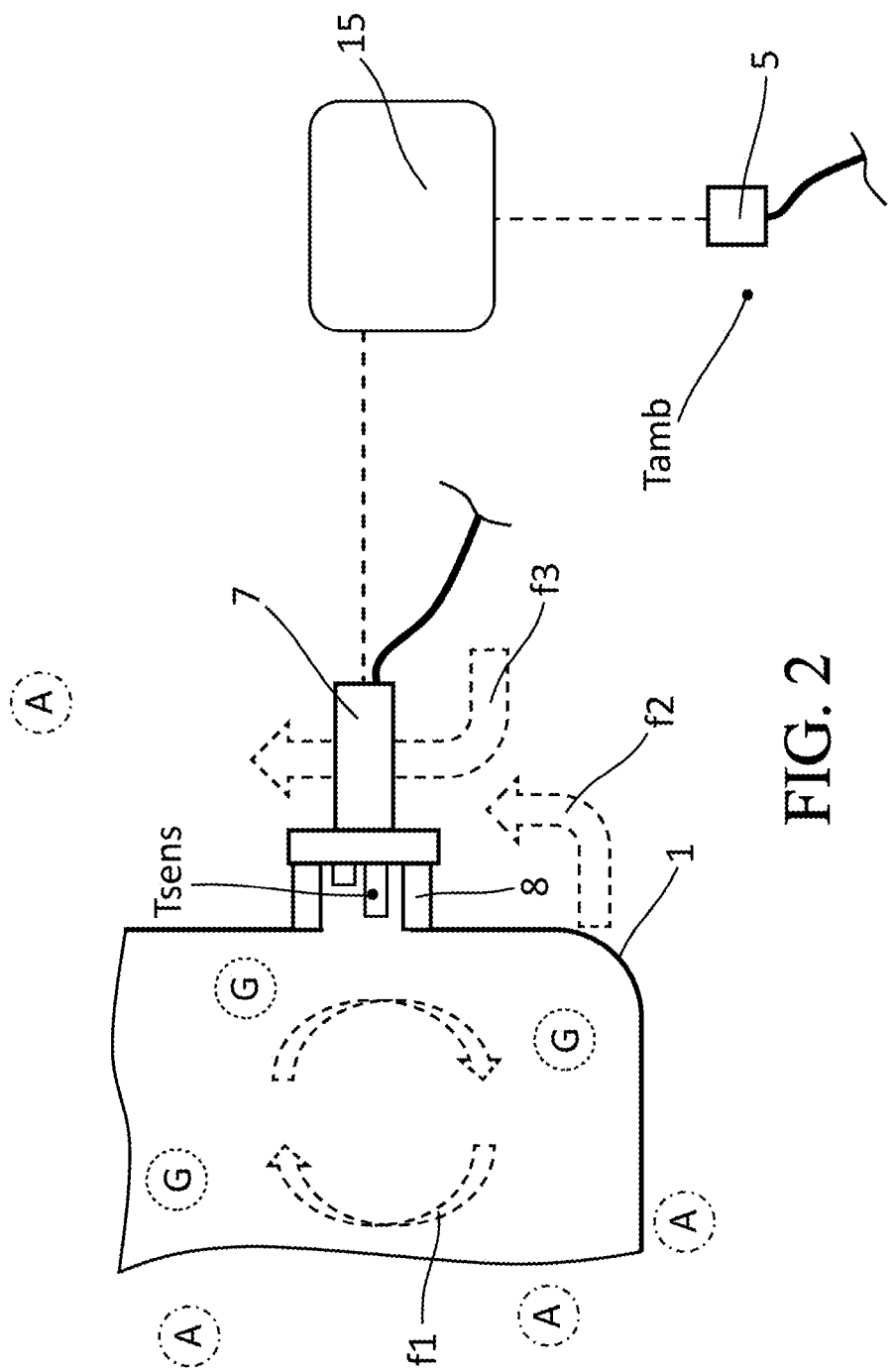
FIG. 2 is a detailed view of the tank of the electrical equipment of FIG. 1.

On FIG. 2, arrows referenced by signs f1, f2, f3 indicate the main contributors to thermal exchanges. f1 is a schematic representation of the natural convection inside the tank. f2 represents the heat flux between the walls of the tank 1 and the ambient air. f3 represents the heat flux between the ambient air and the gas temperature sensor 3, particularly the heat flux between the ambient air and the body 7 of the gas temperature sensor 3. Thermal exchanges and heat transfer are equivalent wordings.

According to an embodiment of the method, the gas quantity n is determined from the ratio of the acquired gas pressure Psens and a corrected gas temperature Tcor, the corrected gas temperature Tcor being calculated from the equation:

$$Tcor = Tsens + \frac{R1}{R2} * (Tsens - Tamb) \qquad \text{(equation 1)}$$

wherein

Tcor is the corrected temperature Tcor of the gas inside the tank 1,

Tsens is the gas temperature Tsens measured by the gas temperature sensor 3,

R1 is the first thermal resistance R1 between the gas G contained in the tank 1 and the gas temperature sensor 3, R2 is the second thermal resistance R2 between the gas temperature sensor 3 and the ambient air A outside the tank 1, Tamb is the ambient temperature Tamb measured outside the tank 1.

This equation increases the accuracy of the temperature measurement while being simple to implement.

The gas quantity n is then determined from the equation:

$$n = K * \frac{Psens}{Tcor} \qquad \text{(equation 2)}$$

wherein K is a constant.

K can be obtained by the ratio:

$$K = \frac{V}{R}$$

wherein R is the ideal gas constant and V is the internal volume of the tank 1.

Gas quantity n determination is here based on ideal gas model. Different models could also be used without changing the general principal of the proposed methods. For instance, real gases model could also be used. Coefficient K is determined according to the model selected for the gas quantity determination.

As already mentioned above, gas quantity can also be determined by other—parameters, such as gas density D or equivalent gas pressure P0.

In an embodiment, the gas quantity can be derived from a gas pressure P0 determined from the equation:

$$P0 = T0 * \frac{Psens}{Tcor} \qquad \text{(equation 3)}$$

wherein T0 is a reference temperature and P0 is the equivalent gas pressure if the gas is at a temperature T0. T0 is for example 293K.

In another embodiment, the gas quantity can be derived from a density D determined from the equation:

$$D = K' * \frac{Psens}{Tcor} \quad \text{(equation 4)}$$

wherein K' is a constant. K' can be obtained by the ratio:

$$K' = \frac{Tref}{Pref}$$

wherein Tref is a reference temperature and Pref is a reference pressure. Tref is for example 293K, and Pref is for example 101325 Pa. Reference temperature Tref and reference pressure Pref can be arbitrarily selected, as long as the constant coefficient K' is updated with the selected values of Tref and Pref.

More generally, the gas quantity according to the present disclosure can correspond to any parameter that is proportional to a fraction between the acquired gas pressure measured by the gas pressure sensor and the determined corrected temperature, which provides a true reflection of the quantity of gas contained in the tank.

In an embodiment of the method, the step (iii) of determining a steady-state model M of the tank thermal exchanges comprises the sub-steps:
  (iii1) acquiring a first ambient temperature Tamb1 and a second ambient temperature Tamb2, respectively at the first instant $t_1$ and at the second instant $t_2$ during the calibration phase,
  (iii2) calculating an updated value of the ratio of the first thermal resistance R1 between the gas G contained in the tank 1 and the gas temperature sensor 3 and of the second thermal resistance R2 between the gas temperature sensor 3 and the ambient air A outside the tank 1, from the equation:

$$\frac{R1}{R2} = \frac{P2*T1 - P1*T2}{P1*(T2 - Tamb2) - P2*(T1 - Tamb1)} \quad \text{(equation 5)}$$

wherein
R1 is the first thermal resistance R1 between the gas G contained in the tank 1 and the gas temperature sensor 3,
R2 is the second thermal resistance R2 between the gas temperature sensor 3 and the ambient air A outside the tank 1, P1 is the pressure P1 measured by the gas pressure sensor 4 at the first instant $t_1$,
P2 is the pressure P2 measured by the gas pressure sensor 4 at the second instant $t_2$,
T1 is the first temperature T1 measured by the gas temperature sensor 3 at the first instant $t_1$,
T2 is the second temperature T2 measured by the gas temperature sensor 3 at the second instant $t_2$,
Tamb1 is the ambient temperature Tamb1 at the first instant t1, Tamb2 is the ambient temperature Tamb2 at the second instant t2.

This model with two different thermal resistance provides a good accuracy and requires only reasonable effort for its calibration. Furthermore, this model is robust and can be used for various equipment configurations.

In an embodiment of the method, the step (iii) of determining a steady-state model M of the tank 1 thermal exchanges comprises the sub-step:
  (iii3) after the acquisition of the first temperature T1 and before the acquisition of the second temperature measurement T2, modifying an electrical current intensity in the switchgear 2 so that the temperature of the gas contained in the tank 1 is modified.

Figure 3:
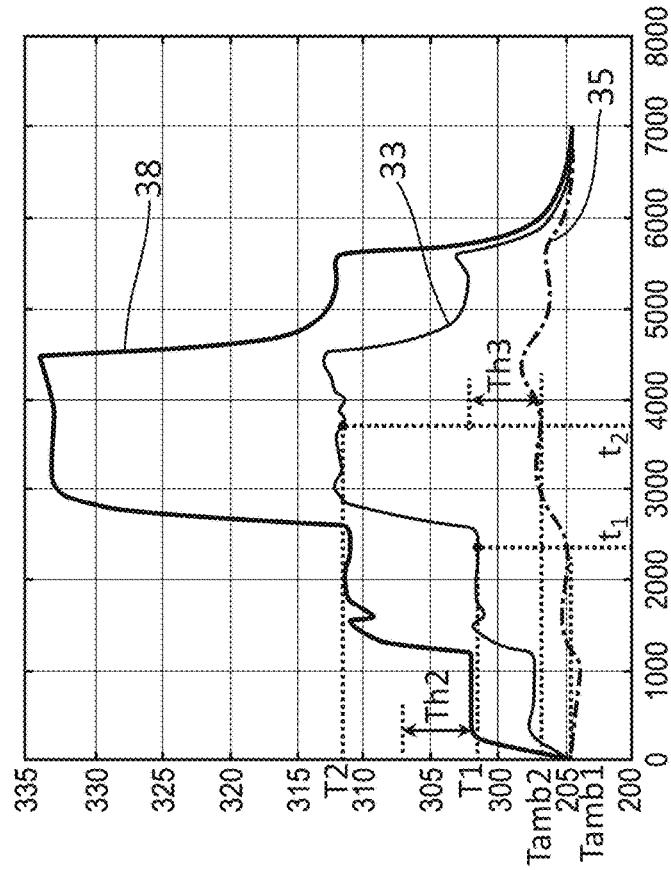
FIG. 3 is a temporal curve illustrating the proposed method for determining the quantity of the gas contained in a tank, during calibration phase.
Figure 3:
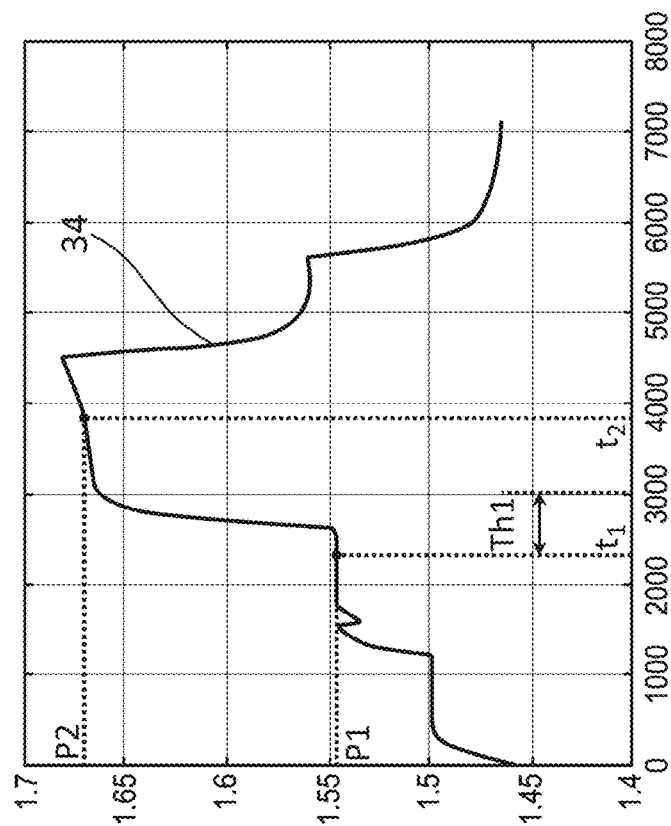

FIG. 3 represents the evolution versus time of the pressure and temperature of the gas contained in the tank 1, over a duration of about two hours (7000 seconds). Part A of FIG. 3 is the evolution of the measured pressure, represented by curve 34. Part B of FIG. 3 is the evolution of ambient temperature Tamb represented by curve 35, measured gas temperature Tsens represented by curve 33, and real gas temperature represented by curve 38. The real gas temperature is here measured by an experimental set-up specifically added for experimental studies, in which a temperature sensor is installed in immediate proximity to the switchgear contacts. This set-up is not implemented on production equipment, and the proposed method will not rely on this experimental set-up. Real gas temperature is represented on curve 38 for information only.

For instance, current intensity is comprised between 1000 A and 1200 A when the first measurement of pressure P1 and temperature T1 is performed at instant $t_1$. Then, current intensity is increased to a value comprised between 1600 A and 2000 A. This higher intensity dissipates more heat inside the tank 1 and the gas progressively warms-up until new steady state conditions are obtained. The second measurement of pressure P2 and temperature T2, at instant t2, corresponds to these new steady state conditions. No fan is present inside the tank 1. No forced convection is involved in the heat transfer inside the tank 1.

According to an aspect of the method, the first instant $t_1$ and the second instant $t_2$ are selected such that the difference between the second instant $t_2$ and the first instant $t_1$ is higher than a first predetermined threshold Th1. The first predetermined threshold Th1 is for example 3 hours. The duration between $t_1$ and $t_2$ for instance satisfies the condition: $(t_2-t_1)$ >3 hours. Other minimum durations between $t_1$ and $t_2$ are possible. The duration between $t_1$ and $t_2$ is selected to be long enough so that a new thermal equilibrium is obtained when the second temperature measurement T2 and the second pressure measurement P2 are performed.

Furthermore, the first instant $t_1$ and the second instant $t_2$ are selected such that: the difference between the second acquired temperature T2 and the first acquired temperature T1 is higher than a second predetermined threshold Th2. The second predetermined threshold Th2 is for example 5° C. The temperature T2 which corresponds to instant $t_2$ satisfies for instance the condition: T2−T1>5° C. This temperature difference indicates that the transition between the first state and the second state has enough amplitude to be differentiated from the background noise of a steady state operation. FIG. 3 represents a situation in which temperature is increased between instant $t_1$ and instant $t_2$. Transitions in which temperature decreases between instant $t_1$ and instant $t_2$ can equally be used for the calibration phase of the model.

The first instant $t_1$ and the second instant $t_2$ are also selected such that: the difference between the second acquired temperature T2 and the second ambient temperature Tamb2 is higher than a third predetermined threshold Th3. The third predetermined threshold Th3 is for instance 5° C. The temperature T2 which corresponds to instant $t_2$ also satisfies the condition: (T2−Tamb2)>5° C. As before, this temperature difference indicates that the transition between the first state and the second state has enough amplitude for allowing an accurate identification of the model parameters.

The three conditions listed above are cumulative, meaning they have to be simultaneously satisfied.

In an embodiment of the method, the sub-steps (iii1), (iii2) and (iii3) are iterated for determining the steady-state model M of the tank thermal exchanges. For this, successive current steps may be performed. The consistency of the identification of the model parameters can thus be checked.

Current intensity is for example increased a first time to obtain a new thermal equilibrium of the tank 1. The pressure and temperature before and after the current modification are used to calculate a value of the ratio R1/R2, as indicated in equation 5. Then a second current modification may be performed, and a new thermal equilibrium is subsequently reached. A new computation of the ratio R1/R2 can be performed from the newly acquired data.

The ratio R1/R2 is initialized for instance to 1.25. This baseline value of the ratio R1/R2 is then updated according to the calculation of equation 5 when the conditions to calculate this ratio are met.

Figure 4:
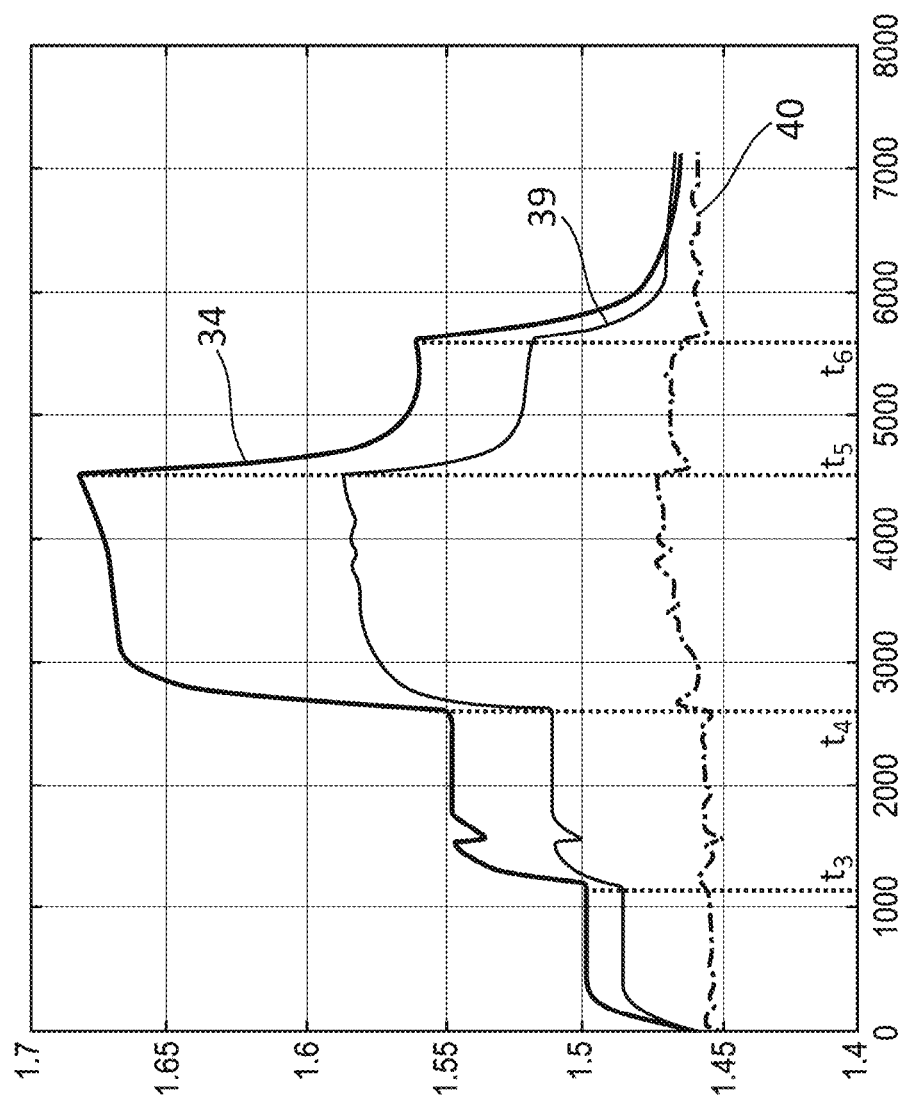
FIG. 4 is a temporal curve illustrating the proposed method for determining the quantity of the gas contained in a tank, during measurement phase.

FIG. 4 illustrates the results of the measurement phase of the method. On FIG. 4, curve 40 indicates the evolution of the determined equivalent pressure P0 and curve 34 indicate the gas pressure Psens measured by the gas pressure sensor 4. Curve 39 is, for comparison, a calculation of equivalent gas pressure performed from the raw measurement of pressure Psens and the raw measured temperature Tsens, in other words without modelling the tank heat transfers. Instants $t_3$ and $t_4$ are instants at which operating conditions are modified and tank pressure increases, which reflects on the curve evolution. The evolution is represented over a two-hour time window, 0 to 8000 seconds. Instant $t_5$ and $t_6$ are instants at which operating conditions are modified and the internal pressure of the tank 1 decreases. Thanks to the modelling of the thermal transfer affecting the gas temperature measurement, it can be observed than the fluctuations of curve 40 are much smaller than the fluctuations of curve 39. In other words, the modelling of the tank heat transfer affecting the gas temperature measurement improves the accuracy of the pressure (and thus gas quantity) determination.

The present disclosure relates also to a method for detecting a gas leakage in a tank 1 of a gas insulated switchgear 2, comprising the steps:
- determining the quantity n of the gas G contained in the tank 1 by the method described earlier,
- detecting a gas leakage based on the evolution of the gas quantity n in function of time.

Tank leakage detection methods are generally based on a monitoring of the pressure inside the tank. As this pressure is influenced by the temperature of the gas, an observed drop in pressure is not necessarily caused by a leakage but can also be caused by a temperature drop. Similarly, the effect of a real leakage may remain undetected if the gas temperature increases simultaneously and tends to maintain the existing pressure. Using a gas quantity as monitored parameter increases the accuracy of the leakage detection method. The fault detection may be quicker, as the safety margin integrated to avoid false detections can be reduced.

The sampling frequency of the gas pressure measurement may be comprised between 0.01 Hz and 1 Hz. The ratio R1/R2 is kept constant when the gas leakage detection method is activated.

In an embodiment, the method comprises the step:
- determining a filtered value Nfilt of the gas quantity n in function of time,
- detecting a gas leakage based on the evolution of the filtered value Nfilt of the gas quantity n in function of time.

Using a filtered value helps putting into evidence the long-term evolution of the quantity of the gas contained inside the tank, independently from the short-term fluctuations caused by the changes in operating conditions, like current intensity.

According to an implementation of the method, the filtered value Nfilt of the gas quantity n is a sliding average of the gas quantity n over a predetermined duration T. The predetermined duration T is higher than 10 days, or even higher than 20 days.

In a variant of the method, the filtered value Nfilt of the gas quantity n is obtained by a first order filter applied to the gas quantity D. The time constant of the first order filter is for example comprised between 1 hour and 6 hours. Other filtering methods are of course possible.

The method comprises the steps:
- calculating an average slope S of the filtered value Nfilt of the gas quantity n,
- if the average slope S is higher than a predetermined threshold S max, detecting that a leakage is present,
- if the average slope S is lower than or equal to the predetermined threshold S max, detecting that the tank 1 is sealed.

In case a leakage is detected, a warning signal can be emitted. The users of the electrical equipment can thus take corrective actions in response to the warning signal. The warning signal can be a warning indicator lighting on. The warning signal can be a sound indicator. The warning signal can be a fault code stored in a permanent memory of the electronic control unit on which the method is implemented.

The severity of the identified fault can be quantified. The context associated with the detected fault, like current intensity, date and time, ambient temperature, and any other parameters, can be stored in memory for subsequent analysis of the identified fault.

Figure 5:
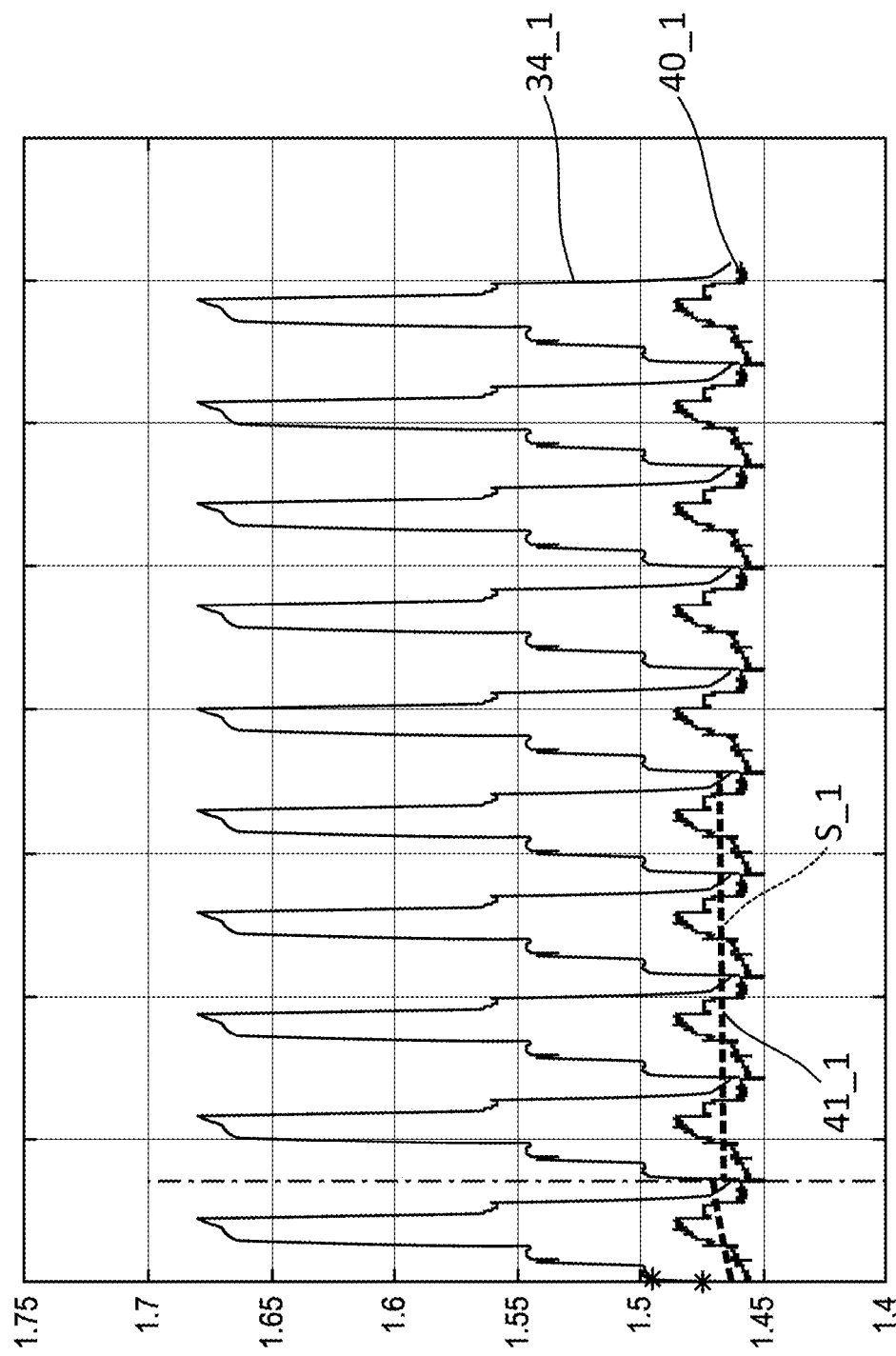
FIG. 5 is a temporal curve illustrating the proposed method for detecting a gas leakage in a tank, when the tank is fluid tight.
Figure 6:
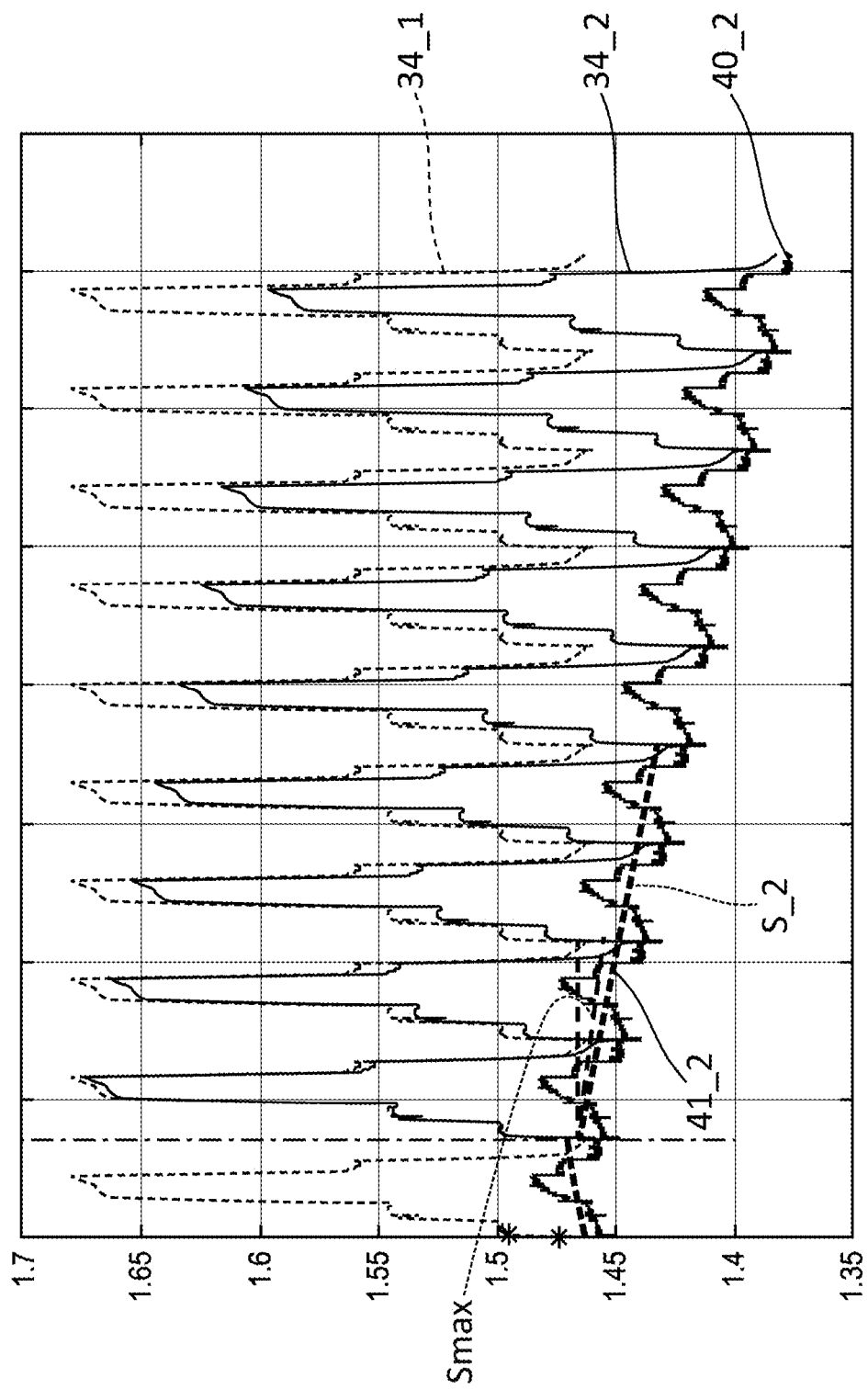
FIG. 6 is another temporal curve illustrating the proposed method for detecting a gas leakage in a tank, when a leakage is present.
Figure 7:
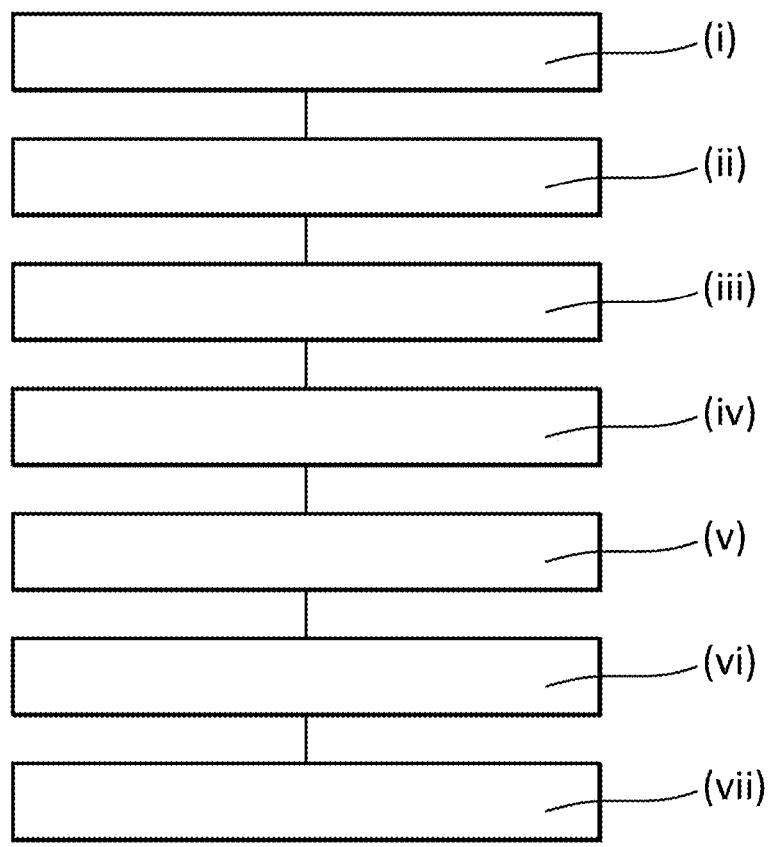
FIG. 7 is a block diagram of different steps of an embodiment of the proposed method.

FIG. 5 illustrates the different parameters of the leakage detection method in a situation where the tank is sealed, i.e no leakage is present. FIG. 6 illustrates the same parameters when a leakage is actually present. Horizontal axis is elapsed time t. The displayed time window is 40 days. On FIGS. 5 and 6, gas quantity n and corresponding filtered value Nfilt are more particularly determined through the equivalent gas pressure P0 and corresponding filtered value Pfilt.

On FIG. 5, curve 40_1 is the temporal evolution of equivalent pressure P0 determined by the proposed method. Curve 41_1 is the temporal evolution of the filtered pressure Pfilt. Parameter S_1 represents the slope of the filtered quantity 41_1. Curve 34_1 represents, for comparison, the temporal evolution of the measured pressure Psens, with the same scale as quantity. On FIG. 6, the different curves are referenced by the same main number associated with the index "_2".

On FIG. 5, curve 40_1 of determined gas equivalent pressure shows oscillations due to the periodic evolution of the current intensity in the switchgear 2. Curve 41_1 is the filtered value of determined pressure. This filtered value is almost constant, and its slope S_1 is almost null. The slope can be determined by linear regression of the curve 41_1. This temporal evolution shows that there's no leakage during the represented time window. For comparison, curve 34_1 shows that the measured pressure Psens is affected by much larger fluctuations that the determined quantity.

On FIG. 6, curve 40_2 of determined equivalent pressure still shows oscillations due to the periodic evolution of the current intensity, associated with a slow long-term decrease. The filtered value 41_2 of gas pressure has a quasi-linear evolution with a negative slope S_2. This slope is here lower than the threshold S max, represented as dashed line. This indicates that the gas equivalent pressure (and thus gas quantity) decreases more quickly than the acceptable reference. A leakage is thus detected. Curve 34_2 illustrates the variations of measured pressure Psens versus time. For comparison, the pressure variations in absence of leakage, represented by curve 34_1, are superposed on the same graph. The amplitude of the periodic variations of pressure are much larger than the slow long-term drift, making leakage detection more difficult. The proposed method is able to confirm a leakage earlier and more accurately.

The invention claimed is:

1. A method for determining a quantity of a gas contained in a tank of a gas insulated switchgear, the tank comprising a gas temperature sensor and a gas pressure sensor, the method comprising the following during a calibration phase:
   (i) acquiring a first temperature and a second temperature measured by the gas temperature sensor respectively at a first instant and at a second instant,
   (ii) acquiring a first pressure and a second pressure measured by the gas pressure sensor at the first instant and at the second instant,
   (iii) determining a steady-state model of the tank thermal exchanges from the first and second acquired temperatures and from the first and second acquired pressures,
   the method further comprising the following during a measurement phase:
   (iv) acquiring a gas temperature measured by the gas temperature sensor,
   (v) acquiring a gas pressure measured by the pressure sensor,
   (vi) acquiring an ambient temperature measured by an ambient temperature sensor outside the tank during the measurement phase, and
   (vii) determining the quantity of the gas from the acquired gas temperature, the acquired gas pressure, the acquired ambient temperature and the determined steady state model.

2. The method according to claim 1, in which the steady-state model comprises a ratio of:
   a first thermal resistance between the gas contained in the tank and the gas temperature sensor over
   a second thermal resistance between the gas temperature sensor and the ambient air outside the tank.

3. The method according to claim 2, in which the step (iii) of determining a steady-state model of the tank thermal exchanges comprises the sub-steps:
   (iii1) acquiring a first ambient temperature and a second ambient temperature, respectively at the first instant and at the second instant during the calibration phase,
   (iii2) calculating an updated value of the ratio of the first thermal resistance between the gas contained in the tank and the gas temperature sensor and of the second thermal resistance between the gas temperature sensor and the ambient air outside the tank, from the equation:

$$\frac{R1}{R2} = \frac{P2*T1 - P1*T2}{P1*(T2 - Tamb2) - P2*(T1 - Tamb1)}$$

wherein
   R1 is the first thermal resistance between the gas contained in the tank and the gas temperature sensor,
   R2 is the second thermal resistance between the gas temperature sensor and the ambient air outside the tank,
   P1 is the pressure measured by the gas pressure sensor at the first instant,
   P2 is the pressure measured by the gas pressure sensor at the second instant,
   T1 is the first acquired temperature measured by the gas temperature sensor at the first instant,
   T2 is the second acquired temperature measured by the gas temperature sensor at the second instant,
   Tamb1 is the ambient temperature at the first instant, and
   Tamb2 is the ambient temperature at the second instant.

4. The method according to claim 3, in which the step (iii) of determining a steady-state model of the tank thermal exchanges comprises the sub-step:
   (iii3) after the acquisition of the first acquired temperature and before the acquisition of the second acquired temperature, modifying an electrical current intensity in the switchgear so that the temperature of the gas contained in the tank is modified.

5. The method according to claim 4, in which the sub-steps (iii1), (iii2) and (iii3) are iterated for determining the steady-state model of the tank thermal exchanges.

6. The method according to claim 3, in which the first instant and the second instant are selected such that:
   a difference between the second acquired temperature and the second ambient temperature is higher than a predetermined temperature threshold.

7. The method according to claim 2, in which the gas quantity is determined from the ratio of the acquired gas pressure and a corrected gas temperature, the corrected gas temperature being calculated from the equation:

$$Tcor = Tsens + \frac{R1}{R2} * (Tsens - Tamb)$$

wherein
   Tcor is the corrected temperature of the gas inside the tank,
   Tsens is the gas temperature measured by the gas temperature sensor,
   R1 is the first thermal resistance between the gas contained in the tank and the gas temperature sensor,
   R2 is the second thermal resistance between the gas temperature sensor and the ambient air outside the tank, and
   Tamb is the ambient temperature measured outside the tank.

8. The method according to claim 1, in which the first instant and the second instant are selected such that:
   a difference between the second instant and the first instant is higher than a predetermined time threshold.

9. The method according to claim 1, in which the first instant and the second instant are selected such that:
   a difference between the second acquired temperature and the first acquired temperature is higher than a predetermined temperature threshold.

10. A method for detecting a gas leakage in a tank of a gas insulated switchgear, comprising:
    determining the quantity of the gas contained in the tank by the method according to claim 1, and
    detecting a gas leakage based on an evolution of the gas quantity in function of time.

11. The method according to claim 10, further comprising:
    determining a filtered value of the gas quantity in as a function of time, and
    detecting a gas leakage based on the evolution of the filtered value of the gas quantity as a function of time.

12. The method according to claim 11, further comprising:
   calculating an average slope of the filtered value of the gas quantity,
   if the average slope is higher than a predetermined threshold, detecting that a leakage is present, and
   if the average slope is lower than or equal to the predetermined threshold, detecting that the tank is sealed.

13. The method according to claim 11, in which the filtered value of the gas quantity is a sliding average of the gas quantity over a predetermined duration.

14. The method according to claim 11, in which the filtered value of the gas quantity is obtained by a first order filter applied to the gas quantity.

15. Electrical equipment comprising a switchgear, a tank configured for accommodating the switchgear, and an electronic control unit configured for implementing the method according to claim 10.

16. Electrical equipment comprising a switchgear, a tank configured for accommodating the switchgear, and an electronic control unit configured for implementing the method according to claim 1.

\* \* \* \* \*